United States Patent
Hoppes (10) Patent No.: US 7,158,597 B2
(45) Date of Patent: Jan. 2, 2007

(54) TFO RESYNCHRONIZATION SYSTEM

(75) Inventor: Brian R. Hoppes, Herndon, VA (US)

(73) Assignee: Tellabs Operations, Inc., Naperville, IL (US)

( * ) Notice: Subject to any disclaimer, the term of this patent is extended or adjusted under 35 U.S.C. 154(b) by 627 days.

(21) Appl. No.: 09/933,571

(22) Filed: Aug. 20, 2001

(65) Prior Publication Data

US 2003/0035501 A1   Feb. 20, 2003

(51) Int. Cl.
 H04L 7/00   (2006.01)
(52) U.S. Cl. .................. 375/362; 375/357; 370/503
(58) Field of Classification Search .............. 375/362, 375/356, 368, 113, 114, 354, 357; 370/505, 370/510, 514, 435, 521, 468, 473, 523, 512, 370/112, 328, 522, 329, 336, 345, 503, 509; 704/200, 500, 221, 212, 228; 455/436, 517, 455/550, 553, 560, 561, 439, 432, 536
See application file for complete search history.

(56) References Cited

U.S. PATENT DOCUMENTS

| | | | | |
|---|---|---|---|---|
| 4,763,339 A | * | 8/1988 | Sutphin et al. | 375/365 |
| 5,539,751 A | * | 7/1996 | Sabel | 370/514 |
| 5,905,733 A | * | 5/1999 | Solve et al. | 370/522 |
| 5,933,468 A | * | 8/1999 | Kingdon | 375/362 |
| 5,953,666 A | * | 9/1999 | Lehtimaki | 455/439 |
| 5,956,377 A | * | 9/1999 | Lang | 375/372 |
| 6,108,560 A | * | 8/2000 | Navaro et al. | 455/517 |
| 6,125,120 A | * | 9/2000 | Lehtimaki | 370/435 |
| 6,172,974 B1 | | 1/2001 | Tseng et al. | |
| 6,320,880 B1 | * | 11/2001 | Suvanen | 370/512 |
| 6,553,041 B1 | * | 4/2003 | Borneman et al. | 370/522 |
| 6,556,844 B1 | * | 4/2003 | Mayer | 455/560 |
| 6,577,645 B1 | * | 6/2003 | Meyer et al. | 370/468 |
| 2001/0019958 A1 | * | 9/2001 | Delfs et al. | 455/445 |

OTHER PUBLICATIONS

ETSI EN 300 737 V7.2.1 (Sep. 2000); Digital cellular telecommunications system (Phase 2+); In-band control of remote transcoders and rate adaptors for full rate traffic channels (GSM 08.60 version 7.2.1 Release 1998).*
ETSI TS 101 504 V8.0.0 (Apr. 2000); Digital cellular telecommunications system (Phase 2+); Inband Tandem Free Operation (TFO) of Speech Codecs; Service Description; Stage 3 (GSM 06.82 version 8.0.0 Release 1999).*
ETSI TS 101 504 V8.0.1 (Aug. 2000); Technical Specification, "Digital cellular telecommunications system (Phase2+); Inband Tandem Free Operation (TFO) of Speech Codecs; Service Description; Stage3", (GSM 08.62 version 8.0.1 Release 1999), Global System for Mobile Communications.

* cited by examiner

Primary Examiner—Temesghen Ghebretinsae
(74) Attorney, Agent, or Firm—Johnson & Associates (57) ABSTRACT

A method and apparatus is provided for use in an inband signaling system for quickly resynchronizing devices in the system after synchronization is lost. Synchronization is quickly established by continuing to apply a synchronization technique even while the devices are synchronized, as opposed to starting the synchronization technique only after synchronization is lost.

21 Claims, 6 Drawing Sheets

TFO RESYNCHRONIZATION SYSTEM

FIELD OF THE INVENTION

This invention relates to the field of signaling systems. In particular, this invention is drawn to a system for resynchronizing an inband signaling system.

BACKGROUND OF THE INVENTION

In some communication systems, it is necessary to send data along with a signaling channel. For example, in inband signaling systems, a message channel is created based on inband signaling information provided with the signaling channel.

In a typical inband signaling system, the system uses the least significant bit (LSB) of every $M^{th}$ sample of a signaling channel. In most cases, the degradation resulting from the use of the collected LSBs is not significant. The collected LSBs are concatenated to create an inband message channel which can be used by the inband signaling system for various purposes, including to facilitate tandem free operation (TFO) between two or more devices in the system.

One problem with inband signaling systems is that devices in the system must be synchronized in order to decode the inband signals. GSM specifications, for example, define the synchronization and resynchronization patterns and suggests attempting resynchronization in +/− one frame. Prior to synchronization, there are M possible signaling channels, where M−1 is the total number of samples occurring between each inband signal bit (described below). Until the system can determine which of the M possible signaling channels is the correct one, the devices will not be synchronized. In prior art inband signaling systems, it can take considerable time to achieve synchronization since all of the M possible signaling channels have to be collected and compared to a synchronization pattern before synchronization is achieved. However, it is desirable to achieve synchronization as quickly as possible. Therefore, there is a need for techniques to speed up the synchronization or re resynchronization process.

SUMMARY OF THE INVENTION

An embodiment of the invention provides a method of maintaining synchronization of an inband signaling system comprising the steps of: collecting inband signaling information from samples in a signaling channel; synchronizing the signaling system based on the collected inband signaling information; and continuing to collect inband signaling information while the signaling system is synchronized for use in resynchronizing the signaling system when synchronization is lost.

Another embodiment of the invention provides a method of facilitating tandem free operation of two devices in an inband signaling system having an inband signaling message comprised of the concatenation of the least significant bit of every $M^{th}$ sample of a digital signaling channel, the method comprising the steps of: collecting the least significant bit of samples of the digital signaling channel; filling M sample grids with the collected bits to provide M possible sample grids; determining whether any of the M sample grids match a reference bit pattern in order to detect the presence of an inband signaling channel; synchronizing the two devices using a detected inband signaling channel; and continuing to fill the M sample grids while the two devices are synchronized in order to maintain all of the possible sample grids to facilitate rapid resynchronization of the two devices if synchronization is lost.

One embodiment includes a tandem free operation inband signaling synchronization system comprising: a storage device for maintaining a plurality of sample grids, wherein samples are collected from a signaling channel and are used to fill the plurality of sample grids; and a detector for detecting the presence of an inband signaling channel based on the contents of the plurality of sample grids, wherein a detected inband signaling channel is used to synchronize devices to facilitate tandem free operation, and wherein the collection of samples continues during synchronization to maintain the plurality of sample grids for facilitation of rapid resynchronization.

Another embodiment of the invention provides a method of synchronizing devices in an inband signaling system comprising the steps of: providing a synchronization technique for synchronizing one or more devices in the inband signaling system; applying the synchronization technique to the inband signaling system to synchronize the one or more devices; and continuing to apply the synchronization technique while the one or more devices are synchronized in order to facilitate rapid resynchronization of the one or more devices if synchronization is lost.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

While the present invention may used with any type of inband signaling system, the invention will be described in the context of a wireless communication system. In general, the present invention provides a system for quickly resynchronizing devices in an inband signaling system after synchronization is lost. Synchronization is quickly established by continuing to apply a synchronization technique and maintaining a record of the potential message channels for all frames even while the devices are synchronized, as opposed to starting the synchronization technique only after synchronization is lost.

Figure 1:
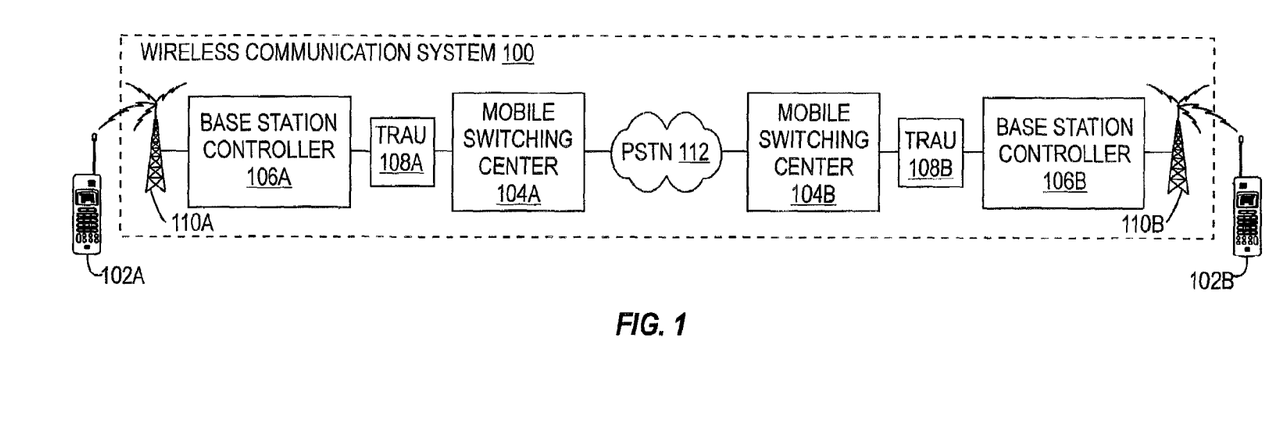
FIG. 1 is a block diagram of a wireless communication system that may be used with the present invention.

As mentioned above, the invention will be described in the context of a wireless communication system. FIG. 1 is a block diagram of a wireless communication system which may be used with the present invention. FIG. 1 shows a wireless communication system 100 with first and second mobile stations 102A and 102B, which may be comprised of cellular telephones, for example. The communication system 100 includes a plurality of mobile switching centers (MSCs) 104, each servicing and being in communication with a plurality of base station controllers (BSCs) 106 and transcoder and rate adapter unit (TRAUs) 108. For clarity, FIG. 1 only shows two MSCs 104 and one BSC 106 and TRAU 108 for each MSC 104. Each BSC 106 has an associated antenna 110 for radio frequency (RF) wireless communication with a plurality of mobile stations such as mobile stations 102A and 102B. Communication between an originating MSC 104 (the MSC transmitting a signal) and a termination MSC 104 (the MSC receiving the signal) is shown in FIG. 1 through a public switched telephone network (PSTN) 112.

In a wireless communication network, the network can be thought of having a radio portion and a wireline portion. In most wireless communication networks (e.g. GSM systems), the radio portion of the communications network carries voice signals in a compressed format while the wireline portion carries voice signals in an uncompressed format. In the example of a GSM system, the wireline portion carries voice traffic in 8-bit wide data chunks and can be connected directly to the PSTN.

During normal operation of the communication system 100, a mobile station (e.g., mobile station 102A) will digitize and compress audio voice signals from a user and transmit the compressed signals to the antenna 110A of the base station controller 106A via a RF transmission. At the base station controller 106A, the RF transmissions are received and decompressed by a TRAU 108A into a digitized format, such as pulse code modulation (PCM), depending on the particular wireless system (e.g., GSM, TDMA, CDMA, W-CDMA, etc.).

The decompressed signals are transmitted from the originating MSC 104A to the terminating MSC 104B over the PSTN 112. On the terminating side, the decompressed signals are again compressed by the TRAU 105B. The resulting compressed signal can then be transmitted by the BSC 106B to the mobile station 102B. The mobile station 102B decompresses the received voice signal and then converts the signal into an audio signal the reception by the user of the mobile station 102B. The process is the same when the mobile station 102B is the originating mobile station and the mobile station 102A is the terminating mobile station.

One advantage of compressing speech signals for RF transmission is that less bandwidth is required for transmission. The main disadvantage to compressing speech signals is a loss of signal quality from compression and decompression. Operating tandemed mobile stations such as those described above, can significantly degrade the quality of the voice signal where the signals are repeatedly compressed and decompressed. In the case where two communicating mobile stations use compatible compression schemes, the decompression and recompression performed by the switching equipment can be skipped, thus preserving more of the signal quality. This mode of operation is called tandem free operation (TFO). In order for the TFO mode to be utilized by two mobile stations, each both mobile stations must be made aware that it is compatible with the other. Typically, TFO systems use inband signaling to check whether the connection between two wireless devices can skip the unnecessary compression, decompression, and recompression involved with normal tandem operation.

Following is a description of an exemplary inband signaling system, including a system for improving resynchronization time. For the purposes of the description of the inband signaling structure, a structure used by GSM systems will be described. Note that the invention may also be used with any other type of inband signaling system. Also note that only one channel will be described. In practice, the processes described below are performed over multiple channels simultaneously. In general, for inband signaling, a communication network will take the LSB of every $M^{th}$ sample of a signaling channel. The collected LSBs are concatenated to create an inband message channel. However, since there will be M possible message channels, a device must know which possible channel is the correct one.

Figure 2:
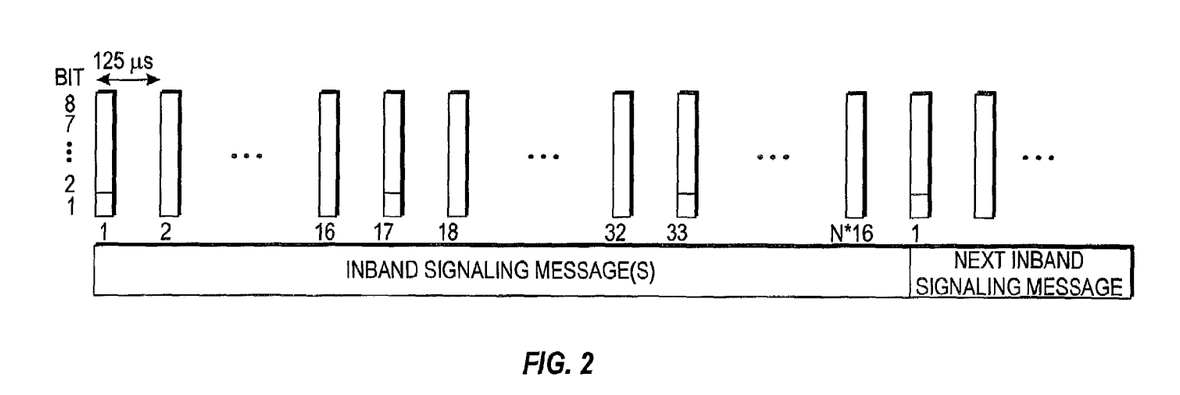
FIG. 2 is a diagram of an inband signaling structure.
Figure 3:
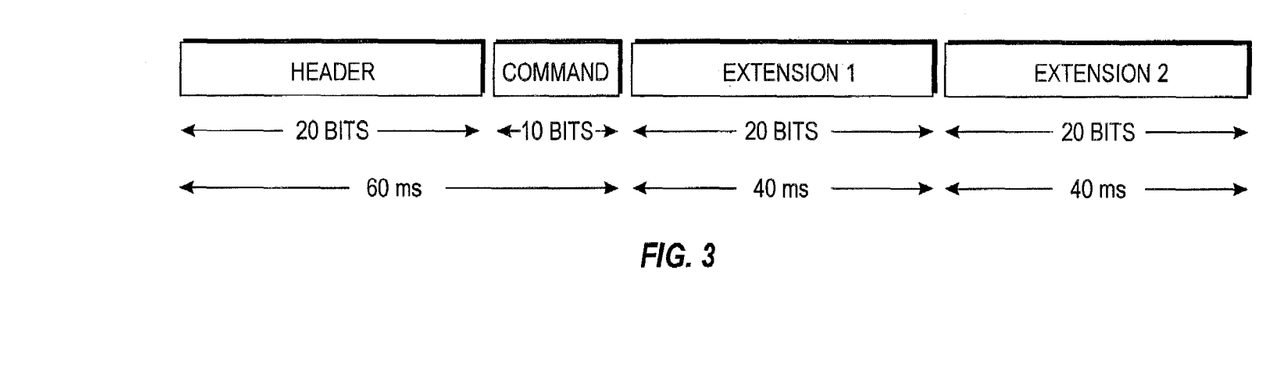
FIG. 3 illustrates an example of an inband signaling message having two extension blocks.

FIG. 2 is a diagram of an inband signaling structure. Each vertical bar denotes an 8-bit PCM sample, where the LSB (illustrated by the box at samples 1, 17, etc.) represents an inserted bit of the inband signaling message. Note that FIG. 2 illustrates an example of an inband signaling structure where M equals 16. By definition, each inband signaling message occupies an integer multiple of sixteen PCM samples. An inband signaling message channel is generated by concatenating the collected LSB's of every sixteen PCM samples. FIG. 3 illustrates an example of an inband signaling message having two extension blocks. The inband signaling message shown in FIG. 3 consists of a 20 bit header followed by a 10 bit command block. Most inband signaling messages have a number of further extension blocks, shown in FIG. 3 as extension 1 and extension 2. By construction, all inband signaling messages have lengths of integer multiples of 10 bits, thus occupying integer multiples of 160 samples, thus lasting for integer multiples of 20 ms.

Figure 4:
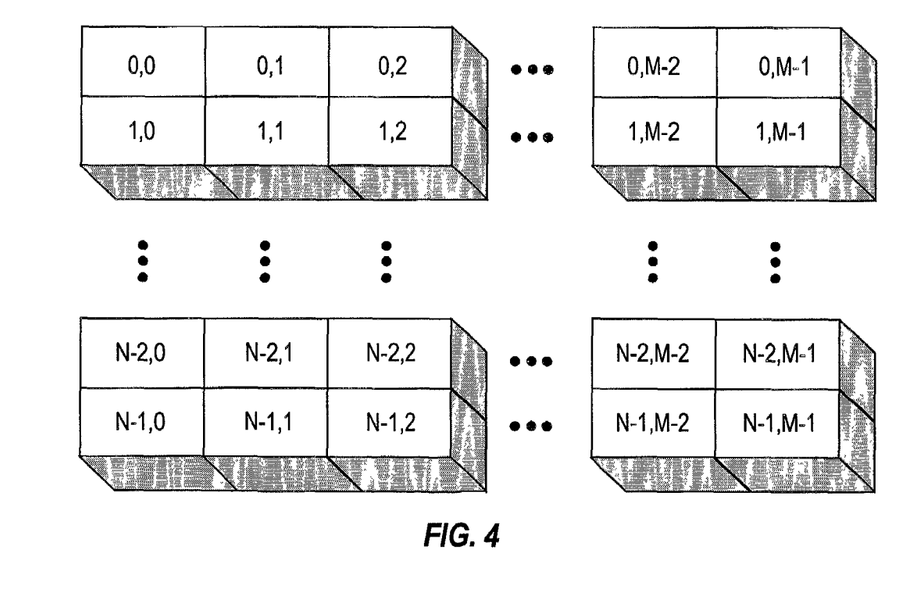
FIG. 4 is a diagram representing M possible sample grids, where each grid contains N samples.

By looking at the inband signaling structure illustrated in FIG. 2 it can be seen that there are 16 possible inband signaling channels. For example, a first possible inband signaling channel is comprised of the LSBs of samples 1, 17, 33, etc. A second possible inband signaling channel is comprised of the LSBs of samples 2, 18, 34, etc. If the system does not know which of the 16 possible inband signaling channels is the correct one, the system is considered to be out of synchronization. Therefore, the system will collect the LSB from every sample in an attempt to determine which of the possible channels is the correct one. FIG. 4 is a diagram representing M possible sample grids, where each grid contains N samples. In other words, each column in FIG. 4 represents the contents of one of the potential message channels. In the case of a GSM system, M may equal 16, while N may equal 20. Once the system can determine which of the possible sample grids is the correct one, the inband signal can be used to facilitate TFO.

Figure 5:
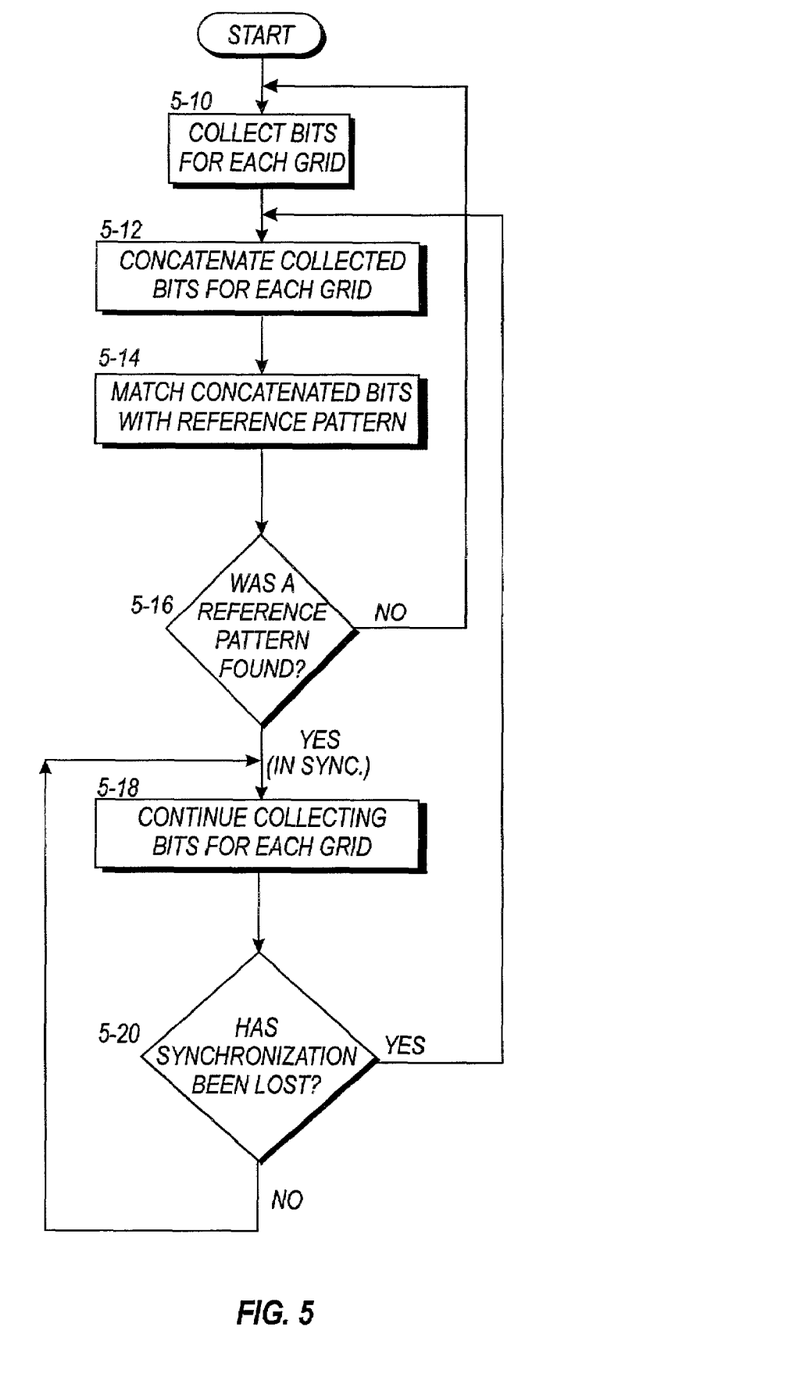
FIG. 5 is a flowchart illustrating a process of the present invention for maintaining synchronization.

FIG. 5 is a flowchart illustrating a process of the present invention for maintaining synchronization. The process illustrated in FIG. 5 begins with step 5–10 where bits are collected for each sample grid. To accomplish step 5–10, the M possible sample grids illustrated in FIG. 4 are filled with LSBs from every sample in the signaling channel. In other words, for every PCM sample from the signaling channel, the LSB is taken and placed in the appropriate box in the grid shown in FIG. 4. At step 5–12, the collected bits for each sample grid are concatenated to create M possible inband message channels. In order to determine which of the possible inband message channels is the correct one, each possible channel is compared to a reference pattern which should only be found in the correct inband message channel. At step 5–16 the process asks whether a reference pattern was found among the possible inband message channels. If no reference pattern was found, the process proceeds back to step 5–10 where more bits are collected. If a reference pattern is found, then the system can determine which possible inband message channel is the correct one. Once the correct inband message channel is found, information contained in the inband message channel can be used to facilitate TFO, or for any other desired purpose. If the reference pattern was found, the process proceeds to step 5–18 where LSBs are continued to be collected for each possible sample grid. Note that in prior art systems, once synchronization is accomplished, the contents of the sample grids are discarded and bits are no longer collected. However, the present invention continues to maintain the contents of the sample grids to facilitate quick resynchronization in the event that synchronization is lost. After step 5–18, the process proceeds to step 5–20 where the process asks whether synchronization has been lost. If synchronization has not been lost (i.e., the devices are still synchronized) the process proceeds back to step 5–18 where bits are continued to be collected for the sample grids. While the system is synchronized, the process repeats steps 5–18 and 5–20. If, at step 520, it is determined that synchronization has been lost, the process precedes back to step 5–12, then step 5–14 where the reference pattern is compared to the concatenated bits from the possible sample grids. Note that since bits are continued to be collected while the system was synchronized, it is likely that the reference pattern will be found among the possible sample grids without re-filling the contents of the sample grids. Also note that in the prior art, the system would remain unsynchronized until the possible sample grids are filled with enough bits to match the reference pattern.

Figure 6:
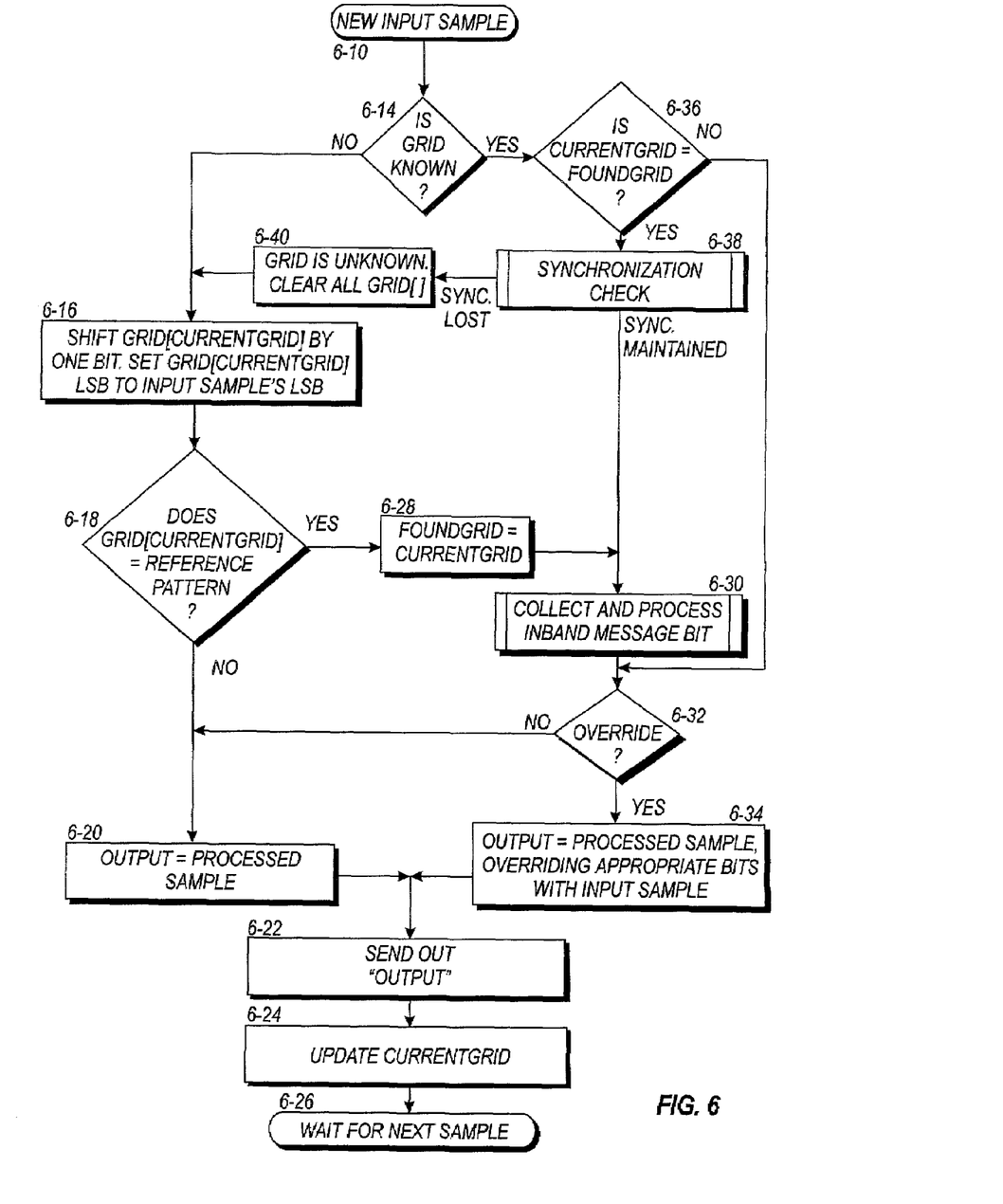
FIGS. 6 and 7 are flowcharts illustrating detailed examples of how devices in an inband signaling system may be synchronized and resynchronized.
Figure 7:
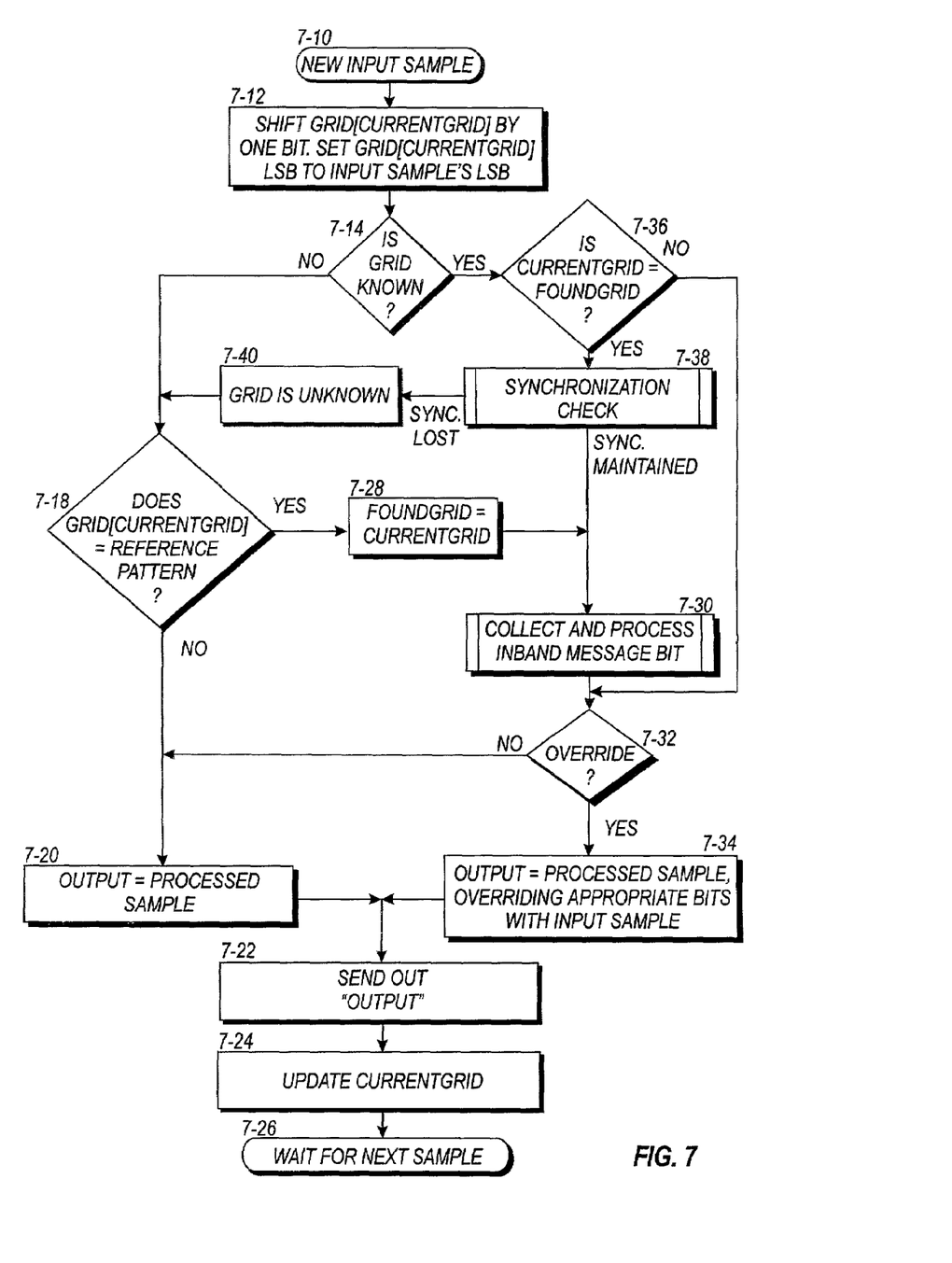

FIGS. 6 and 7 are flowcharts illustrating detailed examples of how devices in an inband signaling system may be synchronized and resynchronized. The processes illustrated in FIGS. 6 and 7 differ in that the process illustrated in FIG. 7 improves upon the process illustrated in FIG. 6 by continuing to collect bits and maintain all of the possible sample grids while the devices are synchronized. Note that the processes illustrated in FIGS. 6 and 7 are executed after every sample from the signaling channel comes in. The terminology used in FIGS. 6 and 7 is explained as follows. The term "grid[ ]" refers to an array of M elements, each of which is N bits wide, where M is a number of possible sample grids and N is sufficiently large to detect the synchronization pattern. The "grid[ ]" is illustrated in FIG. 4. Indexes into "grid[ ]" are 0 based (i.e., have values of 0 through M−1). The term "currentgrid" is an index into the array "grid[ ]" and represents the synchronization position of the current sample. The value for "currentgrid" is updated at the end of each process in preparation for the next sample. The term "foundgrid" is an index into the array "grid[ ]" that represents the synchronization position where synchronization has been found (i.e., the "correct" grid). When "currentgrid"="foundgrid", the element grid[currentgrid] holds the inband signaling information (not just the most recent synchronization pattern).

The process illustrated in FIG. 6 begins with step 6–10 where a new input sample is received. Next, at step 6–14 the process asks whether the correct sample grid is known (i.e., whether the system knows which of the M sample grids illustrated in FIG. 4 contains the inband signaling information). If the correct grid is not known, then the process proceeds to step 6–16 where the grid[currentgrid] is shifted by one bit in preparation for the next LSB of that grid (N samples later). Also, the grid[currentgrid] LSB is set to be the LSB of the input sample. The process then proceeds to step 6–18 where the process asks whether grid[currentgrid] is equal to the reference pattern. If the reference pattern is found in currentgrid, then synchronization is found. If the reference pattern is not found in currentgrid, then the process proceeds to step 6–20 where the output is set to be the processed sample. The process then proceeds to step 6–22 where the output is sent out. Next, at step 6–24, the currentgrid is updated by shifting it one place in preparation for the next sample (i.e., currentgrid=(currentgrid+1) mod M). The process ends at step 6–26 where the process waits for the next sample to come in.

If, at step 6–18, the reference pattern was found, synchronization was just found and the process proceeds to step 6–28 where foundgrid is set to currentgrid. The process then proceeds to a routine at step 6–30 where the inband message bit is collected and processed. In the case shown where inband signaling is being used for TFO, for example, in-path equipment must ensure that bits of the input sample specified by inband signaling messages are left undisturbed by any processing by the equipment. This is accomplished in steps 6–32 and 6–34 where the original bits from the input sample override the output of a processed sample. At step 6–32 the process asks whether the output should be overridden. If not, then the process proceeds to step 6–20. If so, then the process proceeds to step 6–34 where the output is set to the processed sample, overriding the appropriate bits with the input sample. Next, the process proceeds to step 6–22.

Back at step 6–14, if the correct sample grid is known, the process proceeds to step 6–36 where the process asks whether currentgrid is equal to foundgrid (i.e., whether the current sample is known to contain the next inband message bit). If currentgrid is not equal to foundgrid, the process proceeds to step 6–32. If currentgrid is equal to foundgrid, then the process proceeds to a routine at step 6–38 which checks to determine whether synchronization has been maintained. If the routine determines that synchronization has been maintained, the process proceeds to step 6–30. If the routine determines that synchronization has been lost, the process proceeds to step 6–40. At step 6–40 the correct grid is unknown and the contents of the entire grid are cleared. The process then proceeds to step 6–16. Note that because the entire grid is cleared at step 6–40 synchronization will not be found again until a significant portion of the sample grids are filled with data again.

The process illustrated in FIG. 7 is similar to the process illustrated in FIG. 6 except that the sample grids are maintained while the system is synchronized to facilitate a faster resynchronization. The process illustrated in FIG. 7 begins with step 7–10 where a new input sample is received. Next, at step 7–12 the grid[currentgrid] is shifted by one bit and the grid[currentgrid] LSB is set to be the input sample's LSB. Next, at step 7–14 the process asks whether the correct sample grid is known. If not, the process proceeds to step 7–18 where the process asks whether grid[currentgrid] is equal to the reference pattern. If the reference pattern is found in currentgrid, then synchronization is found. If the reference pattern is not found in currentgrid, then the process proceeds to step 7–20 where the output is set to be the processed sample. The process then proceeds to step 7–22 where the output is sent out. Next, at step 7–24, the currentgrid is updated in preparation for the next sample. The process ends at step 7–26 where the process waits for the next sample to come in.

If, at step 7–18, the reference pattern was found, synchronization was just found and the process proceeds to step 7–28 where foundgrid is set to currentgrid. The process then proceeds to a routine at step 7–30 where the inband message bit is collected and processed. In the case shown where inband signaling is being used for TFO, for example, in-path equipment must ensure that bits of the input sample specified by inband signaling messages are left undisturbed by any processing by the equipment. This is accomplished in steps 7–32 and 7–34 where the original bits from the input sample override the output of a processed sample. At step 7–32 the process asks whether the output should be overridden. If not, then the process proceeds to step 7–20. If so, then the process proceeds to step 7–34 where the output is set to the processed sample, overriding the appropriate bits with the input sample. Next, the process proceeds to step 7–22.

Back at step 7–14, if the correct sample grid is known, the process proceeds to step 7–36 where the process asks whether currentgrid is equal to foundgrid (i.e., whether the current sample is known to contain the next inband message bit). If currentgrid is not equal to foundgrid, the process proceeds to step 7–32. If currentgrid is equal to foundgrid, then the process proceeds to a routine at step 7–38, which checks to determine whether synchronization has been maintained. If the routine determines that synchronization has been maintained, the process proceeds to step 7–30. If the routine determines that synchronization has been lost, the process proceeds to step 7–40. At step 7–40 the correct grid is unknown, but the contents of the grid are not cleared. The process then proceeds to step 7–18.

Another advantage of the present invention is that the invention makes it possible to handle more than one inband signaling channel at the same time. As mentioned above, in prior art systems, once synchronization is achieved, the inband message data is collected, but the other possible sample grids are not. The present invention maintains records of all possible sample grids, so it is possible to handle up to M inband signaling channels. For example, if the first inband signaling channel comes from samples 1, 17, 33, etc., a second inband signaling channel could come from samples 2, 18, 34, etc. The additional inband signaling channels could be used for any desired purpose.

The present invention may be implemented in a number of ways. For example, the invention could be implemented using software running on a digital signal processor (DSP) chip. The implementation could be designed around a certain DSP, or, a specialized DSP chip could be designed. The invention could also be implemented in hardware. For example, the invention could be implemented using one or more integrated circuits (ICs) designed to perform the functions described above. For either hardware of software implementations, a storage device may be provided for storing the plurality of sample grids. Other components that may be used by the present invention may include a detector (implemented in hardware of software) for detecting the presence of an inband signaling channel by matching the reference pattern. One example of a detector is a correlator circuit, which examines several pieces of data to find the one closest to a desired value.

Figure 8:
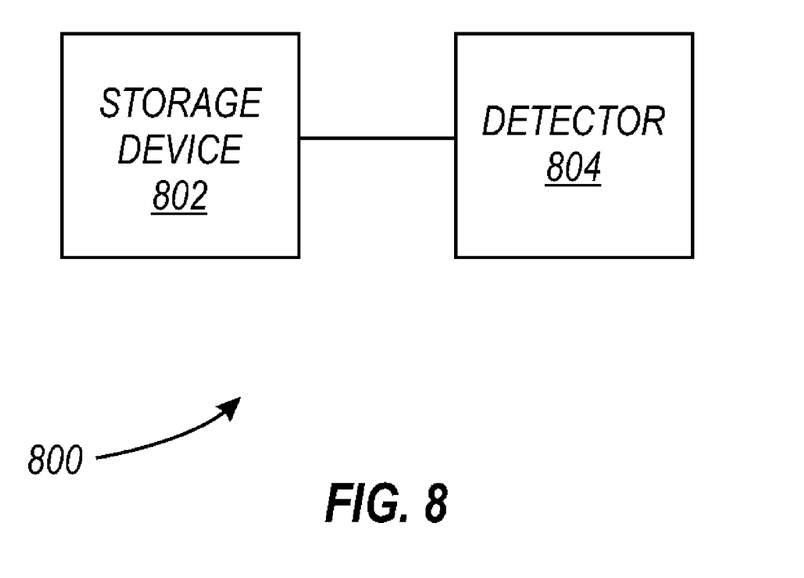
FIG. 8 is a block diagram of a tandem free operation inband signaling synchronization system.

Refefling to FIG. 8, one embodiment includes a tandem free operation inband signaling synchronization system 800 comprising: a storage device 802 for maintaining a plurality of sample grids, wherein samples are collected from a signaling channel and are used to fill the plurality of sample grids: and a detector 804 for detecting the presence of an inband signaling channel based on the contents of the plurality of sample grids, wherein a detected inband signaling channel is used to synchronize devices to facilitate tandem free operation, and wherein the collection of samples continues during synchronization to maintain the plurality of sample grids for facilitation of rapid resynchronization.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of maintaining synchronization of an inband signaling system comprising:
   collecting inband signaling information from samples in a signaling channel;
   using the collected inband signaling information to form a plurality of potential message channels;
   determining which of the plurality of potential message channels relates to a desired message channel;
   synchronizing the signaling system based on the collected inband signaling information; and
   continuing to collect inband signaling information and using the collected inband signaling information to maintain the plurality potential message channels while the signaling system is synchronized for use in resynchronizing the signaling system when synchronization is lost.

2. The method of claim 1, wherein the inband signaling information is comprised of a plurality of bits taken from samples in the signaling channel.

3. The method of claim 2, wherein a plurality of sample grids are filled with the bits taken from samples in the signaling channel.

4. The method of claim 3, wherein the a plurality of sample grids are maintained during the time that the inband signaling system is synchronized.

5. The method of claim 1, further comprising generating an inband message channel from the collected bits.

6. The method of claim 5, further comprising generating a second inband message channel from the collected bits.

7. The method of claim 1, wherein the inband signaling system is a GSM speech network.

8. The method of claim 1, wherein the inband signaling system is a TDMA speech network.

9. The method of claim 1, wherein the inband signaling system is a CDMA speech network.

10. The method of claim 1, wherein the inband signaling system is a W-CDMA speech network.

11. The method of claim 1, further comprising using the inband signaling information to facilitate tandem free operation in the inband signaling system.

12. A method of facilitating tandem free operation of two devices in an inband signaling system having an inband signaling message comprised of the concatenation of the least significant bit of every Mth sample of a digital signaling channel, the method comprising:
   collecting the least significant bit of samples of the digital signaling channel;
   filling M sample grids with the collected bits to provide M possible sample grids;
   determining whether any of the M sample grids match a reference bit pattern in order to detect the presence of an inband signaling channel;
   synchronizing the two devices using a detected inband signaling channel; and
   continuing to fill the M sample grids while the two devices are synchronized in order to maintain all of the possible sample grids to facilitate rapid resynchronization of the two devices if synchronization is lost.

13. The method of claim 12, wherein M is 16.

14. The method of claim 12, wherein the inband signaling system is a GSM speech network.

15. The method of claim 12, wherein the inband signaling system is a TDMA speech network.

16. The method of claim 12, wherein the inband signaling system is a CDMA speech network.

17. The method of claim 12, wherein the inband signaling system is a W-CDMA speech network.

18. The method of claim 12, further comprising detecting the presence of a second inband signaling channel.

19. A tandem free operation inband signaling synchronization system comprising:
   a storage device that maintains a plurality of sample grids, wherein samples are collected from a signaling channel and are used to fill the plurality of sample grids; and
   a detector that detects the presence of an inband signaling channel based on the contents of the plurality of sample grids, wherein a detected inband signaling channel is used to synchronize devices to facilitate tandem free operation, and wherein the collection of samples continues during synchronization to maintain the plurality of sample grids for facilitation of rapid resynchronization.

20. A method of maintaining synchronization in devices in an inband signaling system comprising:
   providing a synchronization technique for synchronizing one or more devices in the inband signaling system, wherein the synchronization technique involves the collection of bits from a signaling channel and filling a plurality of sample grids with the collected bits to provide a plurality of possible sample grids;
   applying the synchronization technique to the inband signaling system to synchronize the one or more devices; and
   continuing to apply the synchronization technique while the one or more devices are synchronized in order to facilitate rapid resynchronization of the one or more devices if synchronization is lost.

21. The method of claim 20, wherein the collection of bits continues while the one or more devices are synchronized.

* * * * *